United States Patent [19]

Mizunuma et al.

[11] Patent Number: 5,721,296
[45] Date of Patent: Feb. 24, 1998

[54] ASPHALT ADDITIVE AND ASPHALT COMPOSITION

[75] Inventors: Tatsuya Mizunuma; Shingo Tanaka; Ryoichi Tamaki; Hitoshi Funada; Takao Taniguchi; Hirotaka Sasaki, all of Wakayama, Japan

[73] Assignee: KAO Corporation, Tokyo, Japan

[21] Appl. No.: 599,999

[22] Filed: Feb. 14, 1996

[30] Foreign Application Priority Data

Feb. 24, 1995 [JP] Japan ................................ 7-036728
Jun. 6, 1995 [JP] Japan ................................ 7-139468

[51] Int. Cl.$^6$ ............................ C28L 95/00; E01C 5/12
[52] U.S. Cl. ........................ 524/60; 524/59; 524/705; 427/136; 427/138
[58] Field of Search ........................ 524/60, 61, 705, 524/59; 427/136, 138

[56] References Cited

U.S. PATENT DOCUMENTS 2,314,181  3/1943  Winterkorn ........................ 524/705

FOREIGN PATENT DOCUMENTS 62-252633  6/1987  Japan .
2-206655   3/1990  Japan .
4-055037   1/1992  Japan .
4-298591   2/1992  Japan .

*Primary Examiner*—Peter A. Szekely
*Attorney, Agent, or Firm*—Birch, Stewart, Kolasch & Birch, LLP

[57] ABSTRACT

Disclosed is an asphalt composition to which a water soluble prepolymer which is resinified while the reaction proceeds gradually in the aqueous solution is added, wherein the strength of the asphalt composition is notably improved. Further, the resinification speed can freely be controlled by the action of a resinification accelerator. Accordingly, the additive for the emulsified asphalt and the asphalt composition for blending at cold temperatures can be applied effectively to various applications such as road pavement, railroad, waterproof agents, and adhesives.

16 Claims, No Drawings

ASPHALT ADDITIVE AND ASPHALT COMPOSITION

[FIELD OF THE INVENTION]

The present invention relates to an asphalt additive and an asphalt composition, useful as binders for pavement, waterproof agents and adhesives, and a method for applying the same.

[DESCRIPTION OF THE RELATED ART]

Bitumen, such as asphalt obtained from petroleum, is emulsified in order to provide workability so that it can be handled at room temperatures and widely applied to paving materials, waterproof materials, adhesive materials, and railroad tracks. Such an asphalt and an aggregate are heated to about 150° C. by a Hot-mixing method, a carbon dioxide gas (principal source material for a warmer climate) is generated from fuel and harmful gases are generated from asphalt, and therefore an asphalt is preferably used after emulsified from an environmental point of view.

However, asphalt compositions using conventional emulsified asphalt have the defect that they are weak in paving strength, durability and waterproofness as compared with the compositions prepared by the hot-mixing method, and they have limited application ranges. An emulsified asphalt composition for paving at cold temperatures which is improved in strength and durability is desired to be developed. The belief that the emulsified asphalt compositions have low strength is as follows. In emulsified asphalt compositions, asphalt particles which are finely emulsified in water become unstable by evaporation of water and are combined to thereby develop the strength. However, the insufficient combination, and emulsifiers remaining in combined asphalt and water which has not been completely removed are considered to generate defects which reduce the strength.

Methods in which rubber and the like are added to asphalt for the purpose of enhancing the strength of asphalt have so far been proposed in, for example, JP-A-2-206655 as a method for improving these defects of emulsified asphalt. However, since these methods harden the properties of asphalt, asphalt particles are difficult to be combined at cold temperatures, which leads to the existing situation that the asphalt compositions have not yet been improved in strength.

Further, it is pointed out that stability of the asphalt emulsion is changed by the kind of the emulsifier (kind of surfactants) and by the quality of the material of the aggregate which are used. In addition, the strength-developing speed thereof is slow since it depends on the water-removing speed.

[DESCRIPTION OF THE INVENTION]

Intensive research made by the present inventors in order to improve the problems described above have resulted in clarifying the cause of reduction in the strength of an asphalt composition using an emulsified asphalt. By the knowledge thereof, an additive for an emulsified asphalt and an asphalt composition which can not only exhibit the strength being equal to or more than that of a conventional asphalt composition can be obtained by the hot-mixing method, but also can control the strength-developing speed.

In general, an asphalt composition comprises an emulsified asphalt and mixed therein a filler such as stone powder, sand, and ballast (including crushed stone). In an asphalt composition using an emulsified asphalt, asphalt particles are combined with each other by removing water by some method to develop the strength of the composition. However, the strength of the asphalt composition is reduced by defects caused by the insufficient combination of asphalt particles or water remaining. Here, the present inventors have paid attention to the fact that the defects caused by emulsified asphalt are a result of the presence of water and found that the strength of an asphalt composition can be improved to a large extent by filling up the spaces where water is present and the spaces where water has been present, with a substance having a strength greater than that of asphalt. Moreover, the strength-developing speed of an asphalt composition which has been another problem, can freely be controlled as well by controlling a strength-developing speed in the spatial parts thereof by a chemical reaction.

The present invention provides for an asphalt composition comprising a water soluble prepolymer which is resinified while the reaction proceeds gradually in the aqueous solution, and an emulsified asphalt.

Further, the present invention provides a method in which thermal molten asphalt is emulsified to obtain an emulsified asphalt, and the prepolymer described above is added thereto and in which a resinification accelerator which can resinify the prepolymer is then added and the asphalt is applied.

The present invention further provides an additive for an emulsified asphalt, comprising a water soluble prepolymer which is resinified while the reaction proceeds gradually in the aqueous solution.

The composition contains preferably the prepolymer of from 0.1 to 75 parts by weight per 100 parts by weight of the solid matters contained in the emulsified asphalt. The water soluble prepolymer has preferably a weight average molecular weight falling in a range of 300 to 50000.

Further, the composition contains preferably a silane coupling agent of from 0.001 to 10 parts by weight per 100 parts by weight of the water soluble prepolymer.

The composition, preferably, further contains a resin accelerator. The resin accelerator comprises an organic acid ester and/or an epoxy compound. The composition, more preferably, contains the epoxy compound of from 0.5 to 100 parts by weight or the organic acid ester of from 1 to 50 parts by weight per 100 parts by weight of the water soluble prepolymer. The composition contains particularly preferably the epoxy compound and the organic acid ester of from 0.5 to 100 parts by weight in all per 100 parts by weight of the water soluble prepolymer.

The preferred water soluble prepolymer includes a condensation product of one or two or more monomer(s) selected from the group consisting monomers represented by any of the following formulas (1) to (8), other monomer copolymerizable therewith, and formaldehyde, or salts thereof. It includes a water soluble resol type phenol prepolymer which will be explained below.

In a method for applying the asphalt in the present invention, a silane coupling agent is preferably added together with the water soluble prepolymer; the resin accelerator comprises either one of the organic acid ester and the epoxy compound, or both of them; or, a filler, a latex, sand and/or ballast are added after adding the water soluble prepolymer. They may be added simultaneously with, or before or after the addition of the resinification accelerator.

That is, the present invention relates to an asphalt additive for an emulsified asphalt, characterized in containing as an essential component, a water soluble prepolymer which is resinified while the reaction proceeds gradually in the aqueous solution, and an asphalt composition for mixing at cold temperatures.

The prepolymer used in the present invention is a formaldehyde condensation product with at least one monomer selected from the monomers represented by the following formulas (1) to (8), and/or a monomer copolymerizable therewith, or the salt thereof, and this water soluble prepolymer is characterized in that resinification thereof goes on with the resin accelerator.

[Chemical formula 2]

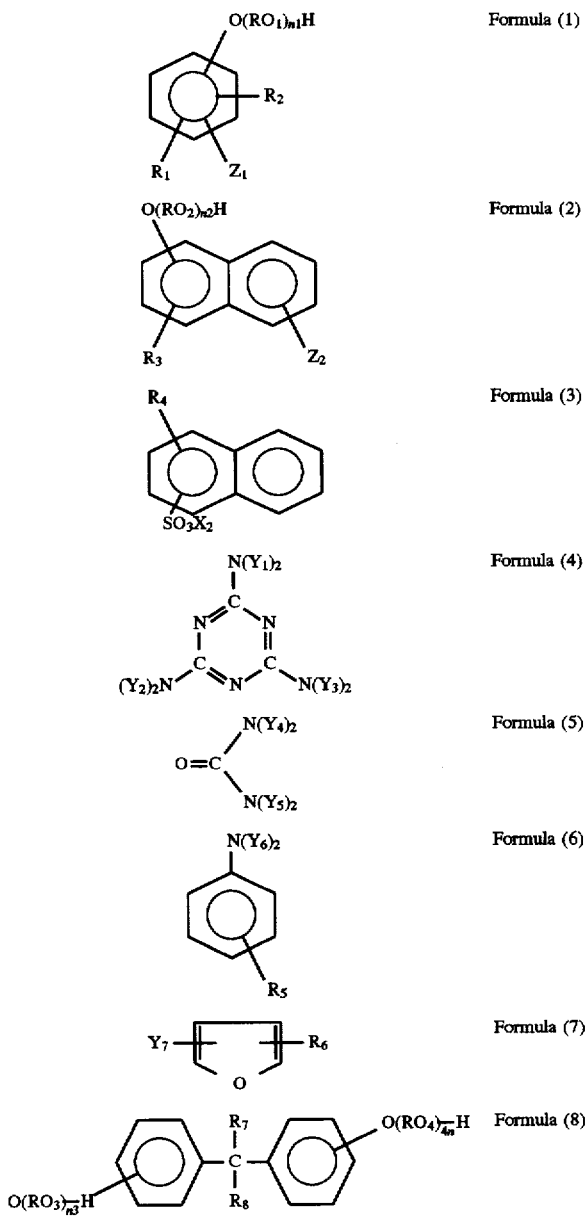

Formula (1)

Formula (2)

Formula (3)

Formula (4)

Formula (5)

Formula (6)

Formula (7)

Formula (8)

(wherein $R_1$ and $R_3$ to $R_8$: H or an alkyl group having 1 to 9 carbon atoms;

$R_2$: H or a hydroxyl group;

$RO_1$ to $RO_4$: an oxyalkylene group having 2 to 3 carbon atoms;

$n_1$ to $n_4$: 0 or positive number of 1 to 100;

$Z_1$ and $Z_2$: H or $SO_3X_1$;

$X_1$ and $X_2$: H, monovalent or divalent metal, ammonium, alkylammonium, or substituted alkylammonium; and $Y_1$ to $Y_7$: H, $CH_2OH$, or $Ch_2SO_3Z_3$ ($Z_3$ is an alkaline metal salt).

A substance comprising a resol type water soluble phenol prepolymer which is a binder is also used as the water soluble prepolymer. The resol type water soluble phenol resin is obtained by condensing phenols with aldehyde compounds in the presence of an alkaline catalyst such as potassium hydroxide and sodium hydroxide. In the present invention, a part of phenols may be substituted with other monomers which can be condensed with aldehydes, for example, amino series substances such as urea and melamine, ketones such as cyclohexanone, and aromatic hydrocarbons such as xylene and toluene. As phenols, phenol; alkylphenols such as cresol, 3,5-xylenol, nonylphenol, p-tert-butylphenol, isopropenylphenol, and phenylphenol; polyhydric phenols such as resorcinol, catechol, hydroquinone, and fluoroglucine; and bisphenols such as bisphenol A, bisphenol F, bisphenol C, and bisphenol E. Further, substances comprising the mixture of phenol series compounds such as a cashew nut husk liquid, lignin, and tannin can also be used as phenols. These various phenols (including other monomers which can be condensed with aldehydes) each may be used singly, or two or more substances of them may be mixed and copolycondensed with the aldehyde compounds.

Formaldehyde, paraformaldehyde, furfural, and glyoxal and the like are used as the aldehyde compounds for condensing with phenols. The aldehyde compounds are used in an amount of 1 to 3 moles, preferably 1.5 to 2 moles per mole of phenols. The use amount of the aldehyde compounds is preferably 1 mole or more from the viewpoint of a binding performance obtained when a binder comprising the resol type water soluble phenol resin described above is cured, and an improvement in the strength of an asphalt composition and is preferably 3 moles or less from the viewpoint of aldehyde odor generated from the resol type water soluble phenol prepolymer, in its turn a working environment.

In general, phenols are condensed with the aldehyde compounds in an alkaline aqueous solution to obtain the resol type water soluble phenol prepolymer. In this case, potassium hydroxide (KOH) is preferably used as a reaction catalyst, and, therefore, the condensation is carried out preferably in a potassium hydroxide aqueous solution. Since the resol type water soluble phenol prepolymer is usually supplied in the form of an alkaline aqueous solution, a prescribed amount of potassium hydroxide may be used in condensing, or after finishing condensing, sodium hydroxide (NaOH), lithium hydroxide (LiOH), or amines such as hexamethylenetetramine may be used in combination to obtain a prescribed alkalinity. In the alkaline solution of the resol type water soluble phenol resin, the mole number of the alkali (base) is preferably 0.08 to 1 mole per mole of a phenolic hydroxyl group, wherein the phenolic hydroxyl group involves all OH groups held by the resol type water soluble phenol prepolymer, that is, all of OH groups connected directly to the aromatic rings and OH groups connected to the aromatic rings via methylene groups. The mole number of the alkali (base) is preferably 0.03 mole or more from the viewpoints of the binding performance of the cured resol type water soluble phenol prepolymer and the stability obtained when it is added to an emulsified asphalt, and is preferably 1 mole or less from the viewpoint of safety in handling.

A silane coupling agent may be contained in a binder aqueous solution containing the resol type water soluble phenol prepolymer in order to enhance the strength of the resulting asphalt composition. Various conventional compounds can be used as the silane coupling agent. In particular, preferably used are γ-glycidoxypropyltrimethoxysilane, γ-aminopropyltrimethoxysilane, γ-(2-aminoethyl) aminopropyltriethoxysilane, and N-glycidyl-N,N-bis[3-(trimethoxysilyl)propyl]amine.

Regardless of whether or not the silane coupling agent is contained, the binder aqueous solution has preferably a viscosity of 50 cps or more at 25° C. from the viewpoint of the strength of the resulting asphalt composition, and preferably 5000 cps or less from the viewpoint of handling. Incidentally, this viscosity is measured by a B type viscometer. A solid content in this binder aqueous solution, that is, a content excluding water (the contents of the resol type water soluble phenol prepolymer and the silane coupling agent) is preferably 35% by weight or more from the viewpoint of the strength of the resulting asphalt composition, and preferably 75% by weight or less from the viewpoint of the viscosity, that is, handling. The above solid content is calculated according to the following equation after water has been evaporated by heating a weighted sample (2.0±0.1 g) at 105° C. for 3 hours in a hot air drier:

solid content (%)=(weight of sample after evaporating water/ weight of weighed sample)×100

The condensation product salt used in the present invention is not specifically restricted as long as the water solubility of the prepolymer is maintained, and includes preferably alkaline metal salts, alkaline earth metal salts, and amine salts, each of which is water soluble.

The weight average molecular weight of the prepolymer used in the present invention is not specifically restricted as long as it is water soluble, and falls in a range of 300 to 50000, preferably 500 to 30000, and more preferably 1000 to 10000 from the viewpoint of the resinification speed.

Further, monomers copolymerizable with the monomers represented by the formulas (1) to (8) described above can be used, for example, compounds having amino groups, ketones, oxybenzoic acid, alkylbenzenes, and furan series compounds are used singly or in a mixture. As compounds having amino groups, urea, melamine, guanamine, aniline, and sulfonamide are used. As ketones, cyclohexanone and methyl ethyl ketone are used. As oxybenzoic acids, salicylic acid, metahydroxybenzoic acid, and parahydroxybenzoic acid are used. Furfuryl alcohol is used as the furan series compound.

Further, the aldehyde compound to be condensed with the monomers (1) to (8) described above includes formaldehyde, paraformaldehyde, furrural, and glyoxal, and they are used singly or in a mixture. The monomer ratio of the monomers (1) to (8) described above (including copolymerizable monomers) to the aldehyde compound is preferably 50/50 to 25/75 in terms of [monomers (1) to (8)+ monomers copolymerizable with them]/aldehyde compound].

The aldehyde condensation product which is the prepolymer of the present invention is not specifically restricted as long as the water solubility is maintained, and includes preferably alkaline metal salts, alkaline earth metal salts, and amine salts, each of which is water soluble.

An alkali catalyst is usually used for the condensation of the monomers described above with the aldehyde compound. KOH is usually used as the alkali catalyst. All of the prescribed amount of KOH may be used as a reaction catalyst, or the amount excluding the minimum amount necessary as the catalyst can be added together with NaOH and Ca(OH)$_2$ in some cases after the reaction.

Further, an acid catalyst can be used for the condensation reaction of the monomers described above with the aldehyde compound. In such case, a prescribed amount of alkali is required to be added after finishing a prescribed reaction. The mole ratio of the whole alkali in the aqueous solution to the phenolic hydroxyl groups is preferably 0.3:1 to 1.2:1, more preferably 0.5:1 to 1.2:1, and further more preferably 0.7:1 to 1.2:1 in terms of alkali/phenolic hydroxyl groups from the viewpoint of the polymerization stability of the prepolymer, in its turn the storage stability of an emulsified asphalt. The lower alkali concentration causes the unexpected reaction of the prepolymer and deteriorates the storage stability of the emulsified asphalt. Thus, it is not preferred.

The average molecular weight of the water soluble prepolymer described above is not specifically restricted as long as the water solubility is maintained and the molecular weight falls in the range where the resinification further proceeds, and is 300 to 50000, preferably 500 to 30000, and more preferably 1000 to 10000. The average molecular weight is preferably 300 or more from the viewpoint of the resinification speed and preferably 50000 or less from the viewpoint of the viscosity.

The amount of the water soluble prepolymer used in the present invention is preferably 0.1 part by weight or more per 100 parts by weight of the solid matters contained in the emulsified asphalt from the viewpoints of the strength, the temperature susceptibility and the adhesive performance to aggregate as the binder. The use amount of the prepolymer is preferably 75 parts by weight or less per 100 parts by weight of the solid matters contained in the emulsified asphalt from the viewpoints of the flexibility as the binder. It is more preferably 0.5 to 50 parts by weight per 100 parts by weight of the solid matters contained in the emulsified asphalt.

The resin accelerator used in the present invention is not specifically restricted and is preferably an organic acid ester or a compound having an epoxy group. Lactones or organic acid esters derived from monohydric or polyhydric alcohols having 1 to 10 carbon atoms and organic carboxylic acids having 1 to 10 carbon atoms are used as the organic acid ester singly or in a mixture. Particularly preferred one includes γ-butyrolactone, propiolactone, ε-caprolactone, methyl formate, ethyl formate, ethylene glycol diacetate, ethylene glycol monoacetate, triacetin, propylene carbonate, dimethyl succinate, dimethyl glutarate, and dimethyl adipate.

There can be used as the compound having an epoxy group (epoxy compound), polyepoxy compounds such as polyglycerol polyglycidyl ether, sorbitol polyglycidyl ether, pentaerythritol polyglycidyl ether, diglycerol polyglycidyl ether, triglycidyltris(2-hydroxyethyl)isocyanurate, glycerol polyglycidyl ether and epoxidized soybean oil; diepoxy compounds such as ethylene-propylene glycol diglycidyl ether, propylene-polypropylene glycol diglycidyl ether, polytetramethylene glycol diglycidyl ether, resorcin diglycidyl ether, neopentyl glycol diglycidyl ether, 1,6-hexanediol diglycidyl ether, bisphenol S diglycidyl ether, bisphenol A diglycidyl ether, bisphenol F diglycidyl ether and dimer acid diglycidyl ester; and monoepoxy compounds such as glycidyl ether of an EO-5 mole adduct of phenol, p-tert-butylphenyl glycidyl ether, and 2-ethylhexyl glycidyl ether. Among them, polyglycerol polyglycidyl ether having 3 or more glycidyl groups in a molecule, or sorbitol polyglycidyl ether is preferred.

When the resin accelerator containing the compound having epoxy groups and the organic acid ester is used, the weight ratio of the compound having epoxy groups to the organic acid ester is preferably 0 to 60 parts by weight, more preferably 1 to 30 parts by weight for the organic acid ester per 100 parts by weight of the compound having epoxy groups. The amount of the organic acid ester exceeding 60 parts by weight relatively reduces the amount of the compound having epoxy groups and tends to lower the strength of the resulting asphalt composition.

In general, this resin accelerator is supplied in the form of a solution.

When the organic acid ester is used, the amount of the resin accelerator used in the present invention is preferably 1.0 part by weight or more per 100 parts by weight of the solid matters contained in the water soluble prepolymer from the viewpoint of the resinification-accelerating effect, and is preferably 50 parts by weight or less per 100 parts by weight of the solid matters contained in the water soluble prepolymer from the viewpoint of controlling the resinification. It is more preferably an amount falling in a range of 3.0 to 25.0 parts by weight. The use amount of the compound having epoxy groups (the epoxy compound) is preferably 0.5 parts by weight par or more and 100 parts by weight or less when it is used singly or in combination with the organic acid ester.

The silane coupling agent used for the additive for the emulsified asphalt of the present invention has an effect to enhance the adhesion of the asphalt composition to aggregate and can improve the strength of the asphalt composition to a large extent.

The concrete examples of the silane coupling agent include trichlorosilane, chloropropyltrisilane, chloropropyltriethoxysilane [Cl—$C_3H_6$—Si($OC_2H_5$)$_3$], chloropropyltrimethoxysilane [Cl—$C_3H_6$—Si($OCH_3$)$_3$], vinyltrichlorosilane, vinyltriethoxysilane [$H_2$C=CH—Si($OC_2H_5$)$_3$], vinyl-tris-(β-methoxy-ethoxy)silane [$H_2$C=CH—Si($OC_2H_4$—$OCH_3$)$_3$], vinyl-triacetoxysilane [$H_2$C=CH—Si(OOC—$CH_3$)$_3$], vinyl-tris-(t-butylperoxy)silane [$H_2$C=CH—Si($OOC_4H_9$)$_3$], vinylmethyldiethoxysilane, β-(N-vinylbenzylamino)-ethyl-γ-amino-propyltrimethoxysilane monohydrogen chloride, γ-aminopropyltriethoxysilane [$H_2$N—$CH_2$—$CH_2$—Si($OC_2H_5$)$_3$], N,N-bis(β-hydroxyethyl)-γ-aminopropyltriethoxysilane [(HO—$C_2H_4$)$_2$-N-$C_3H_6$—Si($OC_2H_5$)$_3$], N-β(aminoethyl)-γ-amino-propyl-trimethoxysilane [$H_2$N—$C_2H_4$—NH—$C_3H_6$—Si($OCH_3$)$_3$], N-β(aminoethyl)-γ-aminopropylethyl-dimethoxysilane [$H_2$N—$C_2H_4$—NH—$C_3H_6$—Si($OCH_3$)$_{2C_2H_5}$], methyl (aminoethoxy-propyl-diethoxy)silane [$H_2$N—($CH_3$)$_2$—O—($CH_2$)$_3$—Si($CH_3$)$_2$—($OC_2H_5$)$_2$], aminoethylaminopropyl-tridecyloxysilane [$H_2$N—($CH_2$)$_2$—NH—($CH_2$)$_3$—Si($OC_{10}H_{21}$)$_3$], γ-mercaptopropyltrimethoxysilane, cyclohexylamino-propyltrimethoxysilane [CycHec-NH—($CH_2$)$_3$—Si($OCH_3$)$_3$, CycHec: cyclohexyl group], $CH_3$OOC—($CH_2$)$_2$—NH—($CH_2$)$_2$—Si($OCH_3$)$_3$, γ-methacryloxypropyltriethoxysilane [$H_2$C=C($CH_3$)COO—($CH_2$)$_3$—Si($OC_2H_5$)$_3$], γ-methacryloxypropyl-tris (2-methoxyethoxy)silane [$H_2$C=C($CH_3$)COO—($CH_2$)$_3$—Si($OC_2H_4$—$OCH_3$)$_3$], β-(3,4-epoxyl-cyclohexyl)-ethyltrimethoxysilane [EpxCycHec-$C_2H_4$—Si($OCH_3$)$_3$, EpxCycHec: 3,4-epoxyl-cyclohexyl group], epoxycyclohexyltrimethoxysilane [EpxCycHec-Si($OCH_3$)$_3$, EpxCycHec: 3,4-epoxyl-cyclohexyl group], γ-glycidoxypropyltriethoxysilane [Gly-$CH_2$—O($CH_2$)$_3$—Si($OC_2H_5$)$_3$, Gly: γ-glycide group], methyltrimethoxysilane, vinyltriethoxysilane [$H_2$C=CH—Si($OC_2H_5$)$_3$], bis[3-(triethoxysilyl)-propyl]-tetrasulfane, bis[3-(triethoxysilyl)-propyl]-trisulfane, and bis[3-(triethoxysilyl)-propyl]-disulfane.

Among them, the compounds having epoxy group or amino groups in the molecules are particularly preferred, and since these reaction groups can chemically bond to the prepolymer of the component (a) and contain hydrolyric groups which are reactive to aggregate used for paving roads, they act as a specific adhesive aid for the water soluble prepolymer and the aggregate and can resultingly improve the strength of the asphalt composition to a large extent.

In the present invention, the blend amount of the silane coupling agent is preferably 0.001 part by weight or more, more preferably 0.1 to 1 part by weight per 100 parts by weight of the water soluble prepolymer of the component (a) from the viewpoint of the strength.

The emulsified asphalt used in the present invention can be in the form of an anionic emulsion, a cationic emulsion, a nonionic emulsion, and an amphoteric emulsion. The surfactant as an emulsifier capable of being used in the present invention can be anionic, cationic, nonionic, or amphoteric surfactants, and may be of one type or a multi-component system of two or more types.

The anionic surfactant includes carboxylic acid salts, sulfuric acid ester salts, sulfonic acid salts, and phosphoric acid ester salts and also includes ethylene oxide adducts and propylene oxide adducts of them.

The cationic surfactant includes alkylamine salts, alkanolamines, quaternary ammonium salts, amine oxides, and polyethylenepolyamines and also includes ethylene oxide adducts and propylene oxide adducts thereof. Here, in case of the cationic surfactants which are not quaternary salts, they are used in the forms of the respective acid salts of hydrochloric acid, acetic acid, nitric acid, sulfamic acid, and dimethylsulfuric acid.

The nonionic surfactant includes polyethylene glycol type surfactants such as higher alcohol-ethylene oxide adducts, alkylphenol-ethylene oxide adducts, fatty acid-ethylene oxide adducts, polyhydric alcohol fatty acid ester-ethylene oxide adducts, higher alkylamine-ethylene oxide adducts, fatty acid amide-ethylene oxide adducts, ethylene oxide adducts of oil and fat and polypropylene glycol-ethylene oxide adducts; and polyhydric alcohol type surfactants such as fatty acid ester of glycerol, fatty acid ester of pentaerythritol, fatty acid esters of sorbitol and sorbitan, fatty acid ester of sucrose, alkyl ether of polyhydric alcohol, and fatty acid amides of alkanolamines.

The amphoteric surfactant includes amino acid type and betaine type carboxylic acid salts, sulfuric acid ester salts, sulfonic acid salts, and phosphoric acid esters.

The suitable amount of the emulsifier used is 0.01 to 10.0 weight %, particularly 0.05 to 5.0 weight % based on the total amount of water and asphalt.

The asphalt used for the emulsified asphalt in the present invention includes a substance selected from petroleum straight asphalt, semi-blown asphalt, cut-back asphalt, natural asphalt, petroleum tar, pitch, solvent-debituminized asphalt, and heavy oil, or the mixture of at least two kinds thereof. Further, there can be used as well a modified asphalt mixed with components such as natural rubbers; synthetic rubbers such as a styrene•butadiene copolymer and a chloroprene copolymer; high molecular polymers such as an ethylene•vinyl acetate copolymer; a petroleum resin; and a thermoplastic resin.

The asphalt composition for blending at cold temperatures according to the present invention is characterized in that it contains an emulsified asphalt, and the water soluble prepolymer described above as essential components, and that additional components such as a filler, latex, sand, and ballast are blended therein according to necessity.

Sand, aggregate such as ballast, and a filler each used in the present invention are not specifically restricted and include crushed stone, crusher run, screenings, crushed stone dust, blast furnace slag, and sand. Further, there can be used, luxobite, artificially burned aggregate, aluminum powder, ceramic particles, bright color aggregate such as colored aggregate, asphalt-coated crushed stone, and reproduced aggregate obtained from disposed asphalt pavement. The filler includes a filler portion of screenings, stone powder, incinerator ash, clay, talc, an expanding material, fly ash, and various cements (ultra high-early-strength cement, early-strength cement, ordinary cement, and blended cement).

The latex used in the present invention is added in order to provide the asphalt composition with flexibility and includes styrene butadiene rubber, isoprene rubber, a natural rubber emulsion, a polyacrylic acid emulsion, and a polyvinyl acetate emulsion, but will not be limited to them. The use amount of the latex is preferably 0.1 to 75.0 parts by weight per 100 parts by weight of the solid matters of the emulsified asphalt.

Further, in the present invention, there can suitably be selected and used, water soluble inorganic salts such as ammonium chloride, calcium chloride, ammonium chloride, and iron chloride; and water soluble polymers such as polyvinyl alcohol, gelatin, polyethylene glycol, methyl cellulose, cation starch, and water absorptive polymers.

As described above in detail, the present invention remarkably improves the strength of the asphalt composition by adding to the emulsified asphalt the water soluble prepolymer which is resinified while the reaction is gradually advanced in the aqueous solution. Further, the action of the resin accelerator can freely control the resinification speed. Accordingly, the additive for the emulsified asphalt and the asphalt composition for blending at cold temperatures according to the present invention can effectively be applied to various applications such as road pavement, railroads, waterproof agents, and adhesives.

A method for applying the asphalt of the present invention will be explained in detail. After thermal molten asphalt is emulsified with a suitable emulsifier to obtain an emulsified asphalt, the additive for the emulsified asphalt according to the present invention is added to and blended with the above emulsified asphalt. Then, after a resin accelerator is added and blended according to necessity, the emulsified asphalt thus prepared is applied. Suitable aggregate, filler and other optional components are blended with the emulsified asphalt according to applications. A resin accelerator is added to the asphalt composition (emulsified asphalt+optional components, e.g. aggregate) according to necessity immediately before applying the asphalt composition. This allows the water soluble prepolymer to be resinified in the applied asphalt composition and the strength of the asphalt to be developed. The resin accelerator described in the present invention is such a compound as accelerating the polymerization (resinification) of the water soluble prepolymer which is the component (a) contained in the additive for the emulsified asphalt of the present invention, and may be a substance which reacts in itself to be incorporated into the resin, merely a catalyst which accelerates the polymerization reaction, or a substance having the functions of the both.

Such the resin accelerator has to be added immediately before using the emulsified asphalt. To be concrete, the resin accelerator has to be added immediately before or in blending the emulsified asphalt with ballast and a filler. A method for adding and blending the resin accelerator may be any method as long as it is blended evenly in the system. The water soluble prepolymer is resinified in the asphalt composition (emulsified asphalt+optional components, e.g. aggregate), whereby the strength of the asphalt is developed.

The asphalt composition of the present invention is blended and applied at cold temperatures and can be used for all of applying methods in which this kind of asphalt is used. In such case, the resin accelerator is added to the asphalt composition according to necessity immediately before applying, whereby the water soluble prepolymer contained in the additive for the emulsified asphalt can be cured after applying the asphalt composition. The concrete applying method includes, for example, a method in which the emulsified asphalt is poured directly into a form for paving roads; and a method in which the emulsified asphalt is sprayed with a distributor and used as a sealing agent, an adhesive and a coating agent. Further, included is a method in which the emulsified asphalt is blended with plaster, cement, and sand of inorganic materials with a mixer such as a pug mill mixer and used as binders for road paving materials, railroad materials, and floorings.

[EXAMPLES]

Next, the present invention will be explained in further detail with reference to examples but the present invention will not be restricted to these examples.

Used are in Examples 1-1 to 1-4, the additives for the emulsified asphalt characterized in that the water soluble prepolymers which are resinified while the reaction proceeds gradually in the aqueous solution is contained as an essential component, in Examples 2-1 to 2-4, the additive for the emulsified asphalt characterized in that the silane coupling agents are further contained as an essential component, and in Examples 3-1 to 3-9, the additive for the emulsified asphalt characterized in that the compounds having epoxy groups are further contained as an essential component.

Production example of the water soluble prepolymer

Various monomers were added to an alkaline aqueous solution and stirred to dissolve them. A formaldehyde aqueous solution was gradually added to this solution to synthesize various prepolymers shown below. The molecular weights of the prepolymers were controlled by adjusting the reaction time.

The molecular weight of the prepolymer was determined by GPC (gel permeation chromatography) in terms of a weight average molecular weight. A sample solution was adjusted to a prescribed concentration to measure the molecular weight in one guard column TSK HXL (6.5 mm diameter×4 cm, manufactured by Toso Co., Ltd.), one column of TSK G3000HXL (7.8 mm diameter×30 cm), and one column of TSK G2500HXL (7.8 mm diameter×30 cm) which were connected in series. Polystyrene (manufactured by Toso Co., Ltd.) was used as a standard sample.

<Kinds of the water soluble prepolymers>

A-1 : formaldehyde condensation product with phenol (average molecular weight: 3000)

A-2: formaldehyde condensation product with bisphenol A (average molecular weight: 3000)

A-3: formaldehyde condensation product with melamine (average molecular weight: 3000)

A-4: formaldehyde condensation product with furfuryl alcohol (average molecular weight: 3000)

A-5 : formaldehyde condensation product with phenol/ sulfanilic acid (90/10 molar ratio) (average molecular weight:3000)

A-6 : formaldehyde condensation product with phenol/urea (50/50 molar ratio) (average molecular weight: 3000)

A-7: formaldehyde condensation product with phenol (average molecular weight: 500)

A-8: formaldehyde condensation product with phenol (average molecular weight: 1000)

A-9 : formaldehyde condensation product with phenol (average molecular weight: 5000)

A-10: formaldehyde condensation product with phenol (average molecular weight: 10000)

A-11: formaldehyde condensation product with phenol (average molecular weight: 30000)

Example 1-1

Petroleum straight asphalt having a penetration of 80 to 100 was used as asphalt, and sodium oleate of 1% by weight based on the total amount of water and the asphalt was used to prepare an emulsified asphalt having an asphalt content of 60% by weight. After 24 hours, added were the emulsified asphalt naturally cooled down of 10 parts by weight per 100 parts by weight of aggregate, various prepolymers shown in Table 1-1 of 10% by weight based on the solid matters of the emulsified asphalt, and ethylene glycol diacetate as a resinification accelerator of 10% by weight based on the solid matter of the prepolymer, to carry out various tests as shown below. The test results thereof are shown in Table 1-1.

<Strength test>

The strength of the asphalt compositions was measured according to "Marshall stability test method" (immersed in water at 60° C. for 30 min.) described in "Pavement Test Method Manual" (Japan Road Association. published on Dec. 20, 1993). The samples for the Marshall stability test were prepared by the following method.

The asphalt compositions were prepared by charging a pug mill mixer with a compact grain blend aggregate prepared by blending No. 6 crushed stone (obtained from Takatsuki), No. 7 crushed stone (obtained from Takatsuki), sand (obtained from Yodogawa), screenings (obtained from Takatsuki), and stone powder (obtained from Shiga pref.) in a weight ratio of 35:25:20:13:7, the emulsified asphalts prepared above, and the additives for the emulsified asphalt in the ratio described above, further charging with ethylene glycol diacetate (resinification accelerator) of 104 by weight based on the weight of the water soluble prepolymer contained in the additive for the emulsified asphalt, and then blending thereof for 20 sec. The aggregate temperature was set at 20° C. After 10 min., the mixture was put into a mold to prepare the samples for the Marshall stability test at the same temperature with both faces at 50 cycles for a single face, and the samples were cured in a thermostatic chamber at 20° C. and 60% RH for 24 hours. These were used to determine the Marshall stability (kg) and the flow value (1/100 cm).

<Durability test>

A wheel tracking test (temperature: 60° C., ground pressure: 6.4 kgf/cm$^2$) described in "Pavement Test Method Manual" (published by Japan Road Association) was carried out in order to evaluate the durability of the paved samples using the emulsified asphalts. A sample for the wheel tracking test was prepared by the following method.

The emulsified asphalt composition prepared for the strength test was put into a form for compaction to prepare the sample for the wheel tracking test, and it was cured in the thermostatic chamber at 20° C. and 60% RH for 24 hours.

<Evaluation of waterproof performance>

An adhesion test was carried out in order to evaluate the waterproof performance of the asphalt coated on the surface of aggregate with the emulsified asphalt, in its turn an anti-stripping performance. The test method is as follows. Dried aggregate of 5 to 13 mm is immersed in water (20° C.) for one minute, and after drawing it up, it is immediately immersed in the mixture of the emulsified asphalt and the additive for the emulsified asphalt of the present invention for one minute. The aggregate thus processed is placed on a glass plate, and after this is cured in the thermostatic chamber at 20° C and 60% RH for 24 hours, it is immersed in warm water of 80° C. for 30 min. After 30 minutes, a ratio in which an asphalt coating is formed on the surface of the aggregate is judged with naked eyes and shown in terms of an adhesion area (%). Provided that the number of the aggregates used for one test is ten, and the value is shown in terms of the average value. The higher adhesion area rate means that the water proof performance is better.

[Table 1-1]

In the control, the sufficient strength was not obtained even after curing in the thermostatic chamber of 20° C. for 24 hours, and the sample had been broken when it was taken out from a form for compaction. Accordingly, the test could not be carried out.

It can be found from the results shown in Table 1-1 that the addition of the water soluble prepolymer of the present invention improves the strength, durability and waterproof performance of the asphalt compositions.

Example 1-2

The asphalt compositions were prepared and evaluated in the same manners as those in Example 1-1, except that various resinification accelerators specified in Table 1-2 were used. The prepolymer A-1 (molecular weight: 3000) was used for all the samples of the invention. The results of the stability test versus curing time are shown in Table 1-2.

[Table 1-2]

EGDA: ethylene glycol diacetate

MF : methyl formate

PC : propylene carbonate

γ-BL: γ-butyrolactone

TA: triacetin

It can be confirmed from the results shown in Table 1-2 that the use of the organic acid esters as a resinification accelerator in combination with the water soluble prepolymers accelerates the breakage and combination of the emulsified asphalts and in its turn can control the resinification speed of the emulsified asphalt compositions.

Example 1-3

The asphalt compositions were prepared and evaluated in the same manners as those in Example 1-1, except that the water soluble prepolymer was used in the ratios shown in Table 1-3 based on the solid matters of the emulsified asphalt. A-1 (molecular weight: 3000) was used as the water soluble prepolymer. The results of various tests are shown in Table 1-3.

[Table 1-3]

It can be confirmed from the results shown in Table 1-3 that when the addition amount of the water soluble prepolymer is small, the samples tend to be excellent particularly in flexibility (flow value) and when the amount of the prepolymer is increased, the samples are excellent particularly in strength (stability) and durability (dynamic stability).

Example 1-4

The asphalt compositions were prepared and evaluated in the same manners as those in Example 1-1, except that various auxiliary additives shown in Table 1-4 were used in the ratios specified in Table 1-4 based on the solid matters in the emulsified asphalt. The water soluble prepolymer was not used in the control, and A-1 (molecular weight: 3000) was used for all the samples of the invention. The results of various tests are shown in Table 1-4.

TABLE 1-4

Addition amount effects of auxiliary additives

| | | | Marshall stability test | |
|---|---|---|---|---|
| | Latex and cement | | Stability kg | Flow value |
| Control (no prepolymer added) | Latex | 5% | non-cured | non-cured |
| | | 10% | non-cured | non-cured |
| | Cement | 5% | 600 | 20 |
| | | 10% | 850 | 18 |
| | Latex (10%) + cement (5%) | | 550 | 23 |
| Invention | Latex | 5% | 2600 | 34 |
| | | 10% | 2400 | 35 |
| | Cement | 5% | 2850 | 31 |
| | | 10% | 2880 | 30 |
| | Latex (10%) + cement (5%) | | 2830 | 33 |

It can be confirmed that the sufficient strength is obtained as well by adding the auxiliary additives. Though the use purposes are different respectively, latex is used in many cases for the purpose of providing flexibility, and the flow value is improved also in the examples. On the other hand, cement is used in some cases for the purpose of improving the strength as well as adjusting the strength-developing time, and such tendency can be confirmed also in the examples.

Example 2-1

[Preparation of the asphalt compositions]

The asphalt compositions were prepared by the emulsified asphalt and the aggregate those were the same used in Example 1-1.

The asphalt composition was prepared by blending the emulsified asphalt of 10 parts by weight per 100 parts by weight of the aggregate with the additive for the emulsified asphalt which comprises water soluble prepolymer specified in Table 2-1 of 10% by weight per the solid matter amount of the emulsified asphalt, ethylene glycol acetate as a resinification accelerator of 10% by weight and γ-(2-aminoethyl)aminopropyltriethoxysilane of 0.4% by weight, each based on the solid matter amount of the water soluble prepolymer. The obtained asphalt compositions were applied to the following tests.

[Test methods]

(i) Strength test

Carried out in the same manner as that of the method described in Example 1-1.

(ii) Durability test

Carried out in the same manner as that of the method described in Example 1-1, except that the curing time of the samples for the test was changed from 24 hours to 12 hours.

(iii) Evaluation of the waterproof performance

Carried out in the same manner as that of the method described in Example 1-1, except that the curing time of the samples for the test was changed from 24 hours to 12 hours.

[Table 2-1]
Remark:

*: The control could not be subjected to the strength test and durability test since it had been broken when it was taken out of a form for compaction.

In the control, the sufficient strength was not obtained even after curing in the thermostatic chamber of 20° C. for 12 hours, and the sample had been broken when it was taken out from a form for compaction. Accordingly, the test could not be carried out.

Meanwhile, the asphalt compositions to which the additives (water soluble prepolymers and silane coupling agents) for the emulsified asphalt of the present invention were added are improved in strength, durability and waterproof performance.

Example 2-2

The asphalt compositions were prepared and the Marshall stability test was carried out in the same manners as those in Example 2-1, except that A-1 (average molecular weight: 3000) was used as the water soluble prepolymer. The resinification accelerators shown in Table 2-2 were used in the amounts specified in Table 2-2. The addition amounts of the resinification accelerators shown in Table 2-2 are expressed in terms of weight % based on the weight of the water soluble prepolymer contained in the additive for the emulsified asphalt. In the Marshall stability test, the curing time was changed as shown in Table 2-2 to determine the respective stabilities (kg). The results thereof are shown in Table 2-2.

[Table 2-2]

* The resinification accelerators shown in Table 2-2 are as follows:

EGDA: ethylene glycol diacetate

MF: methyl formate

PC: propylene carbonate

γ-BL: γ-butyrolactone

TA: triacetin

It can be confirmed from the results shown in Table 2-2 that the use of the organic acid esters as the resin accelerator accelerates the breakage and combination of the emulsified asphalt and in its turn can control the curing time of the asphalt composition.

Example 2-3

The asphalt compositions were prepared and evaluated in the same manners as those in Example 2-1, except that A-1 (average molecular weight: 3000) was used as the water soluble prepolymer, and the addition amount thereof was changed variously as specified in Table 2-3. The addition amounts of the water soluble prepolymer shown in Table 2-3 are expressed in terms of weight % based on the weight of the solid matters contained in the emulsified asphalt. The results thereof are shown in Table 2-3.

[Table 2-3]
Remarks:

*1: The control could not be subjected to the strength test and durability test since it ad been broken when it was taken out from a form for compaction.

*2: The sample was broken during the test.

Example 2-4

The asphalt compositions were prepared and evaluated in the same manners as those in Example 2-1, except that A-1

(average molecular weight: 3000) was used as the water soluble prepolymer, and the kind and addition amount of the silane coupling agents were changed variously as shown in Table 2-4. The addition amounts of the silane coupling agents specified in Table 2-4 are expressed in terms of weight % based on the weight of the water soluble prepolymer. The results thereof are shown in Table 2-4.

[Table 2-4]

Remarks: the silane coupling agents shown in Table 2-4 are as follows:

B-1: γ-(2-aminoethyl)aminopropyltriethoxysilane

B-2: γ-glycidoxypropyltriethoxysilane

B-3: β-(3,4-epoxy-cyclohexyl)-ethyltrimethoxysilane

B-4: N-β-(aminoethyl)-γ-amino-propyltrimethoxysilane

B-5: epoxycyclohexyltrimethoxysilane

It can be found from the results described above that the combined use of the silane coupling agent enhances the performances in all of the strength and durability.

Examples 3-1 to 3-9

2 moles of phenol per one mole of KOH in terms of a ratio was added to a 50% KOH aqueous solution and dissolved by stirring. A 50% formalin was added to 2 moles of formaldehyde per one mole of phenol while maintaining this solution at 80° C. to allow the condensation reaction of phenol with aldehyde to proceed. The reaction was continued at 80° C. until the viscosity of this reaction liquid reached 2000 cps (25° C.). When this viscosity was reached, the reaction liquid was cooled down to room temperatures, and a 50 KOH aqueous solution was added to 0.85 mole of KOH per one mole of a phenolic hydroxyl group, whereby a resin binder aqueous solution was obtained. γ-Glycidoxypropyltrimethoxysilane of 0.5 parts by weight per 100 parts by weight of this solution was added to obtain a binder comprising a resol type water soluble phenol prepolymer aqueous solution having a viscosity of 600 cps (25° C.). The resol type water soluble phenol prepolymer aqueous solution had a solid content of 50 weight %.

On the other hand, 9 kinds (No. 3-1 to 3-9) of the compounds having epoxy groups or substances prepared by blending the compounds having epoxy groups with organic esters in the prescribed ratios were prepared as the resin accelerators as shown in Table 3-1.

[Preparation of the asphalt compositions]

Straight asphalt having a penetration of 80 to 100 was heated and molten at 150° C. Then, a nonylphenol EO adduct (Emulgen 950 manufactured by Kao Co., Ltd.) of 1 weight % (concentration in the final emulsified asphalt) was added to emulsify it in water, whereby an emulsified asphalt having an asphalt content of 60 weight % was prepared.

After 24 hours, the emulsified asphalt naturally cooled down and the additive for the emulsified asphalt were mixed, and this mixture was added to and blended with ballast to thereby prepare an asphalt composition. The asphalt composition was prepared by blending the emulsified asphalt of 10 parts by weight per 100 parts by weight of the ballast with the additive for the emulsified asphalt. The additive for the emulsified asphalt was added so that the solid matter amount of the resol type water soluble phenol resin contained in the above additive accounted for 10 parts by weight per 100 parts by weight of the solid matters contained in the emulsified asphalt.

[Preparation of the asphalt composition (comparison)]

Straight asphalt having a penetration of 80 to 100 was heated and molten at 150° C. Then, sodium oleate of 1 weight % (concentration in the final emulsified asphalt) was added to emulsify it in water, whereby an asphalt emulsion having an asphalt content of 60 weight % was prepared.

After 24 hours, the emulsified asphalt naturally cooled down was blended with ballast to prepare an asphalt composition. The asphalt composition was prepared by blending the emulsified asphalt of 10 parts by weight per 100 parts by weight of the ballast.

[Test methods]

(1) Strength test:

Carried out in the same manner as that in Example 1-1, except that ethylene glycol diacetate as a resin accelerator was changed to the resin accelerators as shown in Table 3-1.

TABLE 3-1

| No. | Compound having epoxy group (weight ratio) | Organic ester (weight ratio) | (Weight part)** |
|---|---|---|---|
| 3-1 | Denacol EX-512 (100 wt %) | — | 30 |
| 3-2 | Denacol EX-512 (100 wt %) | — | 70 |
| 3-3 | Denacol EX-512 (90 wt %) | DBE (produced by Du Pont)* (10 wt %) | 70 |
| 3-4 | Denacol EX-614B (100 wt %) | | 30 |
| 3-5 | Denacol EX-830 (100 wt %) | | 30 |
| 3-6 | Adeka Resin EP-4100 (100 wt %) | | 30 |
| 3-7 | Adekacizer O-130P (100 wt %) | | 30 |
| 3-8 | Adekacizer O-130P (100 wt %) | | 2 |
| 3-9 | Adekacizer O-130P (100 wt %) | | 80 |

Remarks

*: Dimethyl ester of the mixture of succinic acid, glutaric acid, and adipic acid.

**: amount of the compound having an epoxy group per 100 parts by weight of the resol type water soluble phenol prepolymer (solid matter).

Remarks:

Denacol EX-512: polyglycerol polyglycidyl ether mfd. by Nagase Kasei Ind. Co., Ltd.

Denacol EX-614B: sorbitol polyglycidyl ether mfd. by Nagase Kasei Ind. Co., Ltd.

Denacol EX-830: polyethylene glycol diglycidyl ether mfd. by Nagase Kasei Ind. Co., Ltd.

Adeka Resin EP-4100: bisphenol A-diglycidyl ether mfd. by Asahi Denka Ind. Co., Ltd.

Adekacizer O-130P: epoxidized soybean oil mfd. by Asahi Denka Ind. Co., Ltd.

(2) Durability test:

The test was carried out in the same manner as that in Example 1-1, except that the curing time of the samples for the test was changed from 24 hours to 12 hours and ethylene glycol diacetate as a resin accelerator was changed to the resin acclerators specified in Table 3-1.

(3) Evaluation of waterproof performance:

The test was carried out in the same manner as that in Example 1-1, except that the curing time of the samples for the test was changed from 24 hours to 3 hours and ethylene glycol diacetate as a resin acclerator was changed to resin accelerators specified in Table 3-1.

The test results thereof are shown in Table 3-2.

[Table 3-2]

Remark:

*: The control could not be subjected to the strength test and durability test since it had been broken when it was taken out of a form for compaction.

As apparent from the results shown in Table 3-2, the use of the binder containing the resol type water soluble phenol prepolymer and the resin acclerator containing the compound having epoxy groups could improve the strength of the asphalt composition to a large extent.

TABLE 1-1

Effects of kinds and molecular weights of prepolymers

| | Prepolymer | Weight average Molecular weight | Marshall stability test | | Wheel tracking test Dynamic stability (DS) | Adhesion area (%) |
|---|---|---|---|---|---|---|
| | | | Stability kg | Flow value | | |
| Control | None | — | Non-cured (broken when taking out from form) | | | 5 |
| Invention | A-1 | 3000 | 2800 | 33 | 6010 | 100 |
| | A-2 | 3000 | 2650 | 32 | 5200 | 100 |
| | A-3 | 3000 | 2700 | 31 | 5000 | 100 |
| | A-4 | 3000 | 2530 | 31 | 5050 | 100 |
| | A-5 | 3000 | 2600 | 32 | 5600 | 100 |
| | A-6 | 3000 | 2550 | 31 | 5500 | 100 |
| | A-7 | 500 | 1800 | 39 | 2610 | 100 |
| | A-8 | 1000 | 2050 | 32 | 3000 | 100 |
| | A-9 | 5000 | 2900 | 33 | 6600 | 100 |
| | A-10 | 10000 | 2950 | 29 | 6700 | 100 |
| | A-11 | 30000 | 2850 | 30 | 5700 | 100 |

TABLE 1-2

Effects of resinification accelerators

| | Kind of resinification accelerator | Addition amount (%) | Marshall stability test (stability kg) | | | | |
|---|---|---|---|---|---|---|---|
| | | | After 2 Hr | After 4 Hr | After 6 Hr | After 12 Hr | After 24 Hr |
| Invention | EGDA | 1 | Non-cured | Non-cured | Non-cured | 410 | 1400 |
| | EGDA | 5 | Non-cured | 250 | 550 | 1550 | 2400 |
| | EGDA | 10 | Non-cured | 470 | 1210 | 2400 | 2800 |
| | EGDA | 20 | 250 | 890 | 2010 | 2600 | 2750 |
| | EGDA | 40 | 400 | 1000 | 1600 | 1650 | 1650 |
| | MF | 10 | 200 | 620 | 1520 | 2110 | 2450 |
| | PC | 10 | Non-cured | 450 | 1200 | 2550 | 2600 |
| | γ-BL | 10 | Non-cured | 270 | 610 | 1400 | 2100 |
| | TA | 10 | Non-cured | Non-cured | 510 | 1350 | 1950 |

TABLE 1-3

Addition amount effects of prepolymers

| | Use amount of A-1 (%) | Marshall stability test | | Wheel tracking test Dynamic stability (DS) | Adhesion area (%) |
|---|---|---|---|---|---|
| | | Stability kg | Flow value | | |
| Control | 0 | Non-cured (broken when taking out from form) | | | 5 |
| Invention | 1 | 1100 | 33 | 580 | 100 |
| | 5 | 1500 | 32 | 1000 | 100 |
| | 10 | 2800 | 33 | 6010 | 100 |
| | 50 | 4050 | 28 | 6550 | 100 |
| | 75 | 4050 | 28 | 6850 | 100 |

TABLE 2-1

| | Water soluble prepolymer | Strength test | | Durability test | Waterproof performance test |
| | | Stability (kg) | Flow value | Dynamic stability (DS) | Adhesion area (%) |
|---|---|---|---|---|---|
| Control | None | —* | —* | —* | 5 |
| Invention | | | | | |
| 2-1 | A-1 | 2950 | 32 | 6510 | 100 |
| 2-2 | A-2 | 2850 | 32 | 6200 | 100 |
| 2-3 | A-3 | 2950 | 32 | 6000 | 100 |
| 2-4 | A-4 | 2800 | 31 | 6050 | 100 |
| 2-5 | A-5 | 2900 | 32 | 5900 | 100 |
| 2-6 | A-6 | 2750 | 33 | 6300 | 100 |
| 2-7 | A-7 | 2200 | 37 | 3610 | 100 |
| 2-8 | A-8 | 2550 | 33 | 4000 | 100 |
| 2-9 | A-9 | 3100 | 31 | 6800 | 100 |
| 2-10 | A-10 | 3050 | 29 | 6900 | 100 |
| 2-11 | A-11 | 3050 | 30 | 6700 | 100 |

TABLE 2-2

| | Resinification accelerator | | Strength test: stability (kg) | | | | |
| | | Addition amount | Curing time | | | | |
| | Kind | (weight %) | 2 hrs | 4 hrs | 6 hrs | 12 hrs | 24 hrs |
|---|---|---|---|---|---|---|---|
| Invention | | | | | | | |
| 2-12 | EGDA | 1 | Non-cured | Non-cured | 250 | 550 | 1500 |
| 2-13 | EGDA | 5 | Non-cured | 350 | 550 | 1850 | 2500 |
| 2-14 | EGDA | 10 | 250 | 570 | 1300 | 2700 | 2950 |
| 2-15 | EGDA | 20 | 350 | 1000 | 2550 | 2600 | 2850 |
| 2-16 | EGDA | 40 | 500 | 1250 | 1950 | 2000 | 2000 |
| 2-17 | MF | 10 | 350 | 890 | 2010 | 2500 | 2550 |
| 2-18 | PC | 10 | Non-cured | 550 | 1550 | 2550 | 2600 |
| 2-19 | γ-BL | 10 | Non-cured | 470 | 890 | 1710 | 2400 |
| 2-20 | TA | 10 | Non-cured | Non-cured | 650 | 1500 | 2250 |

TABLE 2-3

| | Addition amount of water soluble prepolymer A-1 (weight %) | Strength test | | Durability test | Waterproof performance test |
| | | Stability (kg) | Flow value | Dynamic stability (DS) | Adhesion area (%) |
|---|---|---|---|---|---|
| Control | None | —*1 | —*1 | —*1 | 5 |
| Invention | | | | | |
| 2-21 | 0.1 | 660 | 31 | 300 | 50 |
| 2-22 | 1 | 1200 | 33 | 880 | 100 |
| 2-23 | 5 | 1800 | 31 | 1550 | 100 |
| 2-24 | 10 | 2950 | 32 | 6000 | 100 |
| 2-25 | 50 | 4550 | 27 | 6650 | 100 |
| 2-26 | 75 | 5050 | 28 | 7850 | 100 |
| 2-27 | 100 | 5550 | 15 | —*2 | 100 |

TABLE 2-4

| | Silane coupling agent | | Strength test | | Durability test | Waterproof performance test |
| | Kind | Addition amount (weight %) | Stability (Kg) | Flow value | Dynamic stability (DS) | Adhesion area (%) |
|---|---|---|---|---|---|---|
| Invention | | | | | | |
| 2-28 | B-1 | 0.1 | 2900 | 31 | 6350 | 100 |
| 2-29 | B-1 | 0.5 | 3050 | 32 | 6600 | 100 |
| 2-30 | B-1 | 1.0 | 3550 | 32 | 6650 | 100 |
| 2-31 | B-1 | 5.0 | 4050 | 30 | 6850 | 100 |
| 2-32 | B-2 | 0.1 | 2950 | 33 | 6450 | 100 |

TABLE 2-4-continued

| | Silane coupling agent | | Strength test | | Durability test | Waterproof performance test |
|---|---|---|---|---|---|---|
| | Kind | Addition amount (weight %) | Stability (Kg) | Flow value | Dynamic stability (DS) | Adhesion area (%) |
| 2-33 | B-2 | 0.5 | 3050 | 32 | 6700 | 100 |
| 2-34 | B-2 | 1.0 | 3600 | 31 | 6700 | 100 |
| 2-35 | B-3 | 0.5 | 3100 | 32 | 6500 | 100 |
| 2-36 | B-4 | 0.5 | 3150 | 30 | 6600 | 100 |
| 2-37 | B-5 | 0.5 | 3100 | 34 | 6700 | 100 |
| 2-38 | Not used | | 2500 | 33 | 5010 | 95 |

TABLE 3-2

| | | Strength test | | Durability test | Waterproof performance test |
|---|---|---|---|---|---|
| | Epoxy/ester No. | Stability (kg) | Flow value | Dynamic stability (DS) | Adhesion area (%) |
| Invention | 3-1 | 3950 | 42 | 7020 | 100 |
| | 3-2 | 3890 | 41 | 7000 | 100 |
| | 3-3 | 3860 | 40 | 6990 | 100 |
| | 3-4 | 3640 | 37 | 6900 | 100 |
| | 3-5 | 3690 | 37 | 6890 | 100 |
| | 3-6 | 3500 | 36 | 6880 | 100 |
| | 3-7 | 3330 | 35 | 6790 | 100 |
| | 3-8 | 1210 | 27 | 3010 | 100 |
| | 3-9 | 3020 | 32 | 5240 | 100 |
| Control | Only emulsion | —* | —* | —* | 5 |

What is claimed is:

1. An asphalt composition comprising a water soluble prepolymer which gradually proceeds to forming a resin in an aqueous solution, an emulsified asphalt and a polymerization accelerator which comprises an ester, an epoxy compound or a mixture of an ester and epoxy compound.

2. The asphalt composition as claimed in claim 1, wherein the water soluble prepolymer is in a range of 0.1 to 75 parts by weight per 100 parts by weight of the solid matters contained in the emulsified asphalt.

3. The asphalt composition as claimed in claim 1, which contains 0.5 to 100 parts by weight of the epoxy compound or 1 to 50 parts by weight of ester, based on 100 parts by weight of the water soluble prepolymer.

4. The asphalt composition as claimed in claim 1, wherein the total amount of the epoxy compound and the ester is in a range of 0.5 to 100 parts by weight in per 100 parts by weight of the water soluble prepolymer.

5. The asphalt composition as claimed in claim 1, which further contains a silane coupling agent.

6. The asphalt composition as claimed in claim 5, wherein the silane coupling agent is in a range from 0.001 to 10 parts by weight per 100 parts by weight of the water soluble prepolymer.

7. The asphalt composition as claimed in claim 1, wherein the water soluble prepolymer is a condensation product, which is obtained by compolymerizing of one or two or more monomer(s) selected from the group of monomers consisting of formulas (1) to (8), and other monomers copolymerizable therewith, and formaldehyde; or a salt thereof:

[Chemical formula 1]

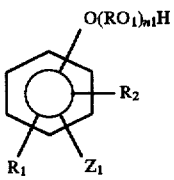

Formula (1)

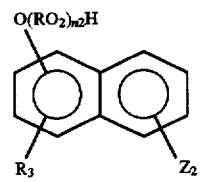

Formula (2)

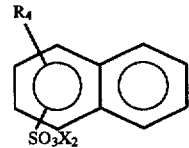

Formula (3)

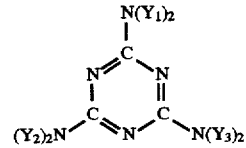

Formula (4)

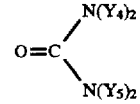

Formula (5)

-continued

[Chemical formula 1]

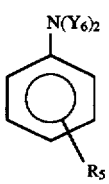  Formula (6)

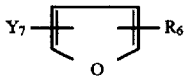  Formula (7)

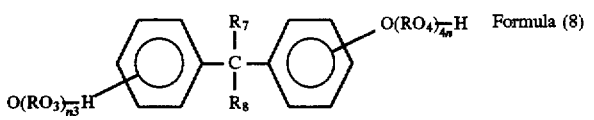  Formula (8)

(wherein $R_1$ and $R_3$ to $R_8$: H or an alkyl group having 1 to 9 carbon atoms;

$R_2$: H or a hydroxyl group;

$OR_1$ to $OR_4$: an oxyalkylene group having 2 to 3 carbon atoms;

$n_1$ to $n_4$: positive number of 0 to 100;

$Z_1$ and $Z_2$: H or $SO_3X_1$;

$X_1$ and $X_2$: H, monovalent or divalent metal, ammonium, alkylammonium, or substituted alkylammonium; and $Y_1$ to $Y_7$: H, $CH_2OH$, or $CH_2SO_3Z_3$ ($Z_3$ is an alkaline metal salt).

8. The asphalt composition as claimed in claim 2, which further contains a silane coupling agent.

9. The asphalt composition according to claim 1 wherein the weight average molecular weight of the prepolymer is 500 to 30,000.

10. The asphalt composition according to claim 9, wherein the weight average molecular weight of the prepolymer is 1000 to 10,000.

11. A method of forming a paved road which comprises applying an asphalt composition according to claim 1 into a form for making said paved road.

12. A method of repairing or sealing a paved road which comprises applying a composition according to claim 1 to a paved road in need of sealing or repair.

13. The composition according to claim 1 further comprising at least one component selected from the group consisting of a filler, latex, sand and ballast.

14. The composition according to claim 13, wherein said component is ballast.

15. The method as claimed in claim 11, which further comprises adding a silane coupling agent to said asphalt composition.

16. The method as claimed in claim 12, which further comprises adding a silane coupling agent to said asphalt composition.

\* \* \* \* \*